US012160628B2

(12) United States Patent
Ren

(10) Patent No.: US 12,160,628 B2
(45) Date of Patent: Dec. 3, 2024

(54) VIDEO PROCESSING METHOD, APPARATUS, DEVICE AND STORAGE MEDIUM

(71) Applicant: Beijing Zitiao Network Technology Co., Ltd., Beijing (CN)

(72) Inventor: Long Ren, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/394,685

(22) Filed: Dec. 22, 2023

(65) Prior Publication Data

US 2024/0129576 A1 Apr. 18, 2024

Related U.S. Application Data

(63) Continuation of application No. PCT/CN2022/106110, filed on Jul. 15, 2022.

(30) Foreign Application Priority Data

Aug. 3, 2021 (CN) .......................... 202110886909.1

(51) Int. Cl.
*H04N 21/431* (2011.01)
*G06V 10/44* (2022.01)
(Continued)

(52) U.S. Cl.
CPC ......... *H04N 21/4316* (2013.01); *G06V 10/44* (2022.01); *G06V 10/761* (2022.01); *H04N 21/4318* (2013.01); *G06V 2201/07* (2022.01)

(58) Field of Classification Search
CPC .......... H04N 21/4316; H04N 21/4318; G06V 10/761
See application file for complete search history.

(56) References Cited

U.S. PATENT DOCUMENTS 9,998,796 B1 * 6/2018 Kedenburg, III .... H04N 21/466
2008/0212933 A1 9/2008 Cawley
(Continued)

FOREIGN PATENT DOCUMENTS

CN 105678686 A 6/2016
CN 106611412 A 5/2017
(Continued)

OTHER PUBLICATIONS

International Search Report and Written Opinion in PCT/CN2022/106110, mailed Oct. 14, 2022, 9 pages.
(Continued)

*Primary Examiner* — Hsiungfei Peng
(74) *Attorney, Agent, or Firm* — Astute IP Law Group

(57) ABSTRACT

Embodiments of the present disclosure provide a video processing method and apparatus, an electronic device, a storage medium, a computer program product and a computer program. First, displaying a video to be processed and at least one sticker in a video processing interface; receiving a selecting operation for a target sticker and identifying a target part of a target object in the video to be processed; displaying the target sticker on the target part in the video to be processed; receiving an editing operation acting on the target sticker and modifying the target sticker; and generating a target video, where the target part in the target video is displayed with the target sticker.

21 Claims, 8 Drawing Sheets

(51) Int. Cl.
    *G06V 10/74*     (2022.01)
    *G11B 27/034*     (2006.01)
    *H04N 21/44*     (2011.01)
    *H04N 21/454*     (2011.01)
    *H04N 21/472*     (2011.01)
    *H04N 21/81*     (2011.01)
    *H04N 21/845*     (2011.01)

(56) References Cited

U.S. PATENT DOCUMENTS

| | | | |
|---|---|---|---|
| 2013/0086476 A1 | | 4/2013 | Thomas |
| 2018/0047169 A1* | | 2/2018 | Lee ......................... G06T 7/194 |
| 2020/0162682 A1 | | 5/2020 | Cheng et al. |
| 2020/0272309 A1* | | 8/2020 | Xiao ..................... G06F 3/0486 |
| 2021/0375320 A1* | | 12/2021 | Wong ................ H04N 21/4223 |

FOREIGN PATENT DOCUMENTS

| | | |
|---|---|---|
| CN | 106777329 A | 5/2017 |
| CN | 107679497 A | 2/2018 |
| CN | 108898649 A | 11/2018 |
| CN | 109495790 A | 3/2019 |
| CN | 110582018 A | 12/2019 |
| CN | 110675310 A | 1/2020 |
| CN | 111083354 A | 4/2020 |
| CN | 111145308 A | 5/2020 |
| CN | 111556335 A | 8/2020 |
| CN | 111866592 A | 10/2020 |
| CN | 112199534 A | 1/2021 |
| CN | 112907702 A | 6/2021 |
| CN | 112929683 A | 6/2021 |
| CN | 113613067 A | 11/2021 |
| JP | 2016028463 A | 2/2016 |
| WO | 2019141100 A1 | 7/2019 |
| WO | 2021098670 A1 | 5/2021 |

OTHER PUBLICATIONS

Notification of Grant in CN202110886909.1, mailed Jul. 20, 2023, 8 pages.
Office Action in CN202110886909.1, mailed Aug. 3, 2022, 12 pages.
Office Action in CN202110886909.1, mailed Feb. 27, 2023, 9 pages.

* cited by examiner

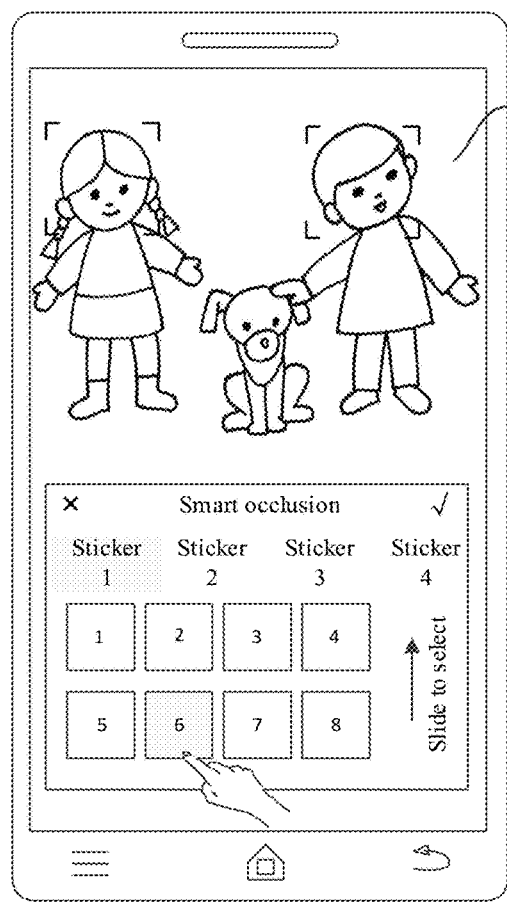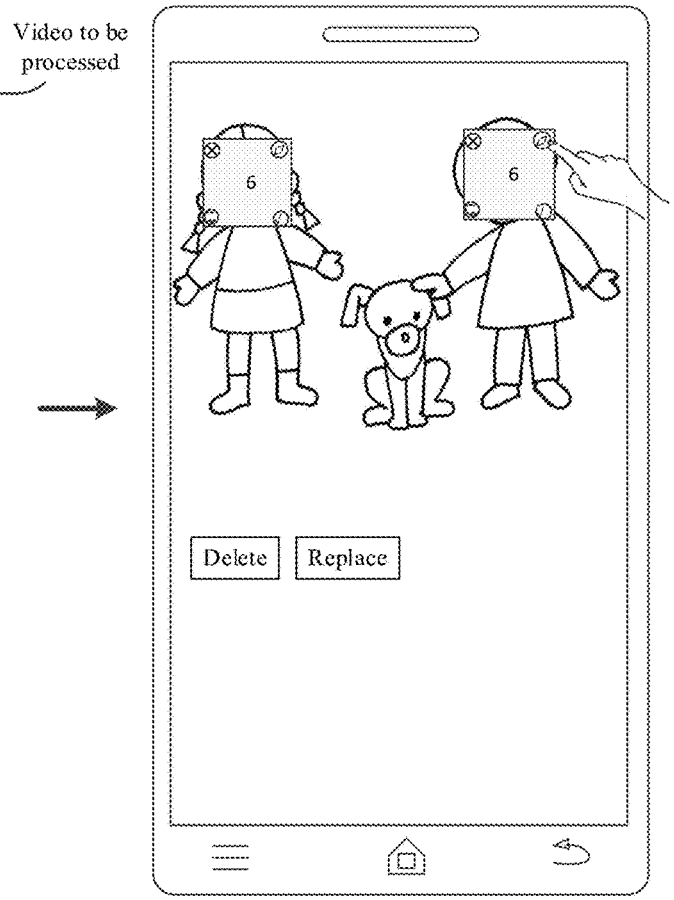
FIG. 3(a)
FIG. 3(b)

VIDEO PROCESSING METHOD, APPARATUS, DEVICE AND STORAGE MEDIUM

CROSS-REFERENCES TO RELATED APPLICATIONS

The present application is a continuation of International Application No. PCT/CN2022/106110, filed on Jul. 15, 2022, which claims priority to Chinese Patent Application No. 202110886909.1, entitled "VIDEO PROCESSING METHOD, APPARATUS, DEVICE AND STORAGE MEDIUM", and filed with the CNIPA on Aug. 3, 2021. The content of the above applications are hereby incorporated by reference in their entireties.

TECHNICAL FIELD

Embodiments of the present disclosure relate to the field of video processing technologies and, in particular, to a video processing method and apparatus, a device, an electronic device, a storage medium, a computer program product and a computer program.

BACKGROUND

With development of Internet technology, services such as short video and live streaming are gradually emerging. In the related art, a video processing process is complex, which affects user experience.

SUMMARY

Embodiments of the present disclosure provide a video processing method and apparatus, a device, a storage medium, an electronic device, a computer program product and a computer program.

In a first aspect, an embodiment of the present disclosure provides a video processing method, including: displaying a video to be processed and at least one sticker in a video processing interface; receiving a selecting operation for a target sticker and identifying a target part of a target object in the video to be processed; displaying the target sticker on the target part in the video to be processed; receiving an editing operation acting on the target sticker and modifying the target sticker; and generating a target video, where the target part in the target video is displayed with the target sticker.

In a second aspect, an embodiment of the present disclosure provides a video processing apparatus, including: a displaying module, configured to display a video to be processed and at least one sticker in a video processing interface; an identifying module, configured to receive a selecting operation for a target sticker and identify a target part of a target object in the video to be processed; the displaying module, further configured to display the target sticker on the target part in the video to be processed; a processing module, configured to receive an editing operation acting on the target sticker, modify the target sticker and generate a target video, where the target part in the target video is displayed with the target sticker.

In a third aspect, an embodiment of the present disclosure provides an electronic device, including at least one processor and a memory; the memory stores computer execution instructions; the at least one processor executes the computer execution instructions stored in the memory to cause the at least one processor to implement the video processing method according to the first aspect.

In a fourth aspect, an embodiment of the present disclosure provides a computer-readable storage medium, where the computer-readable storage medium stores computer execution instructions, and when a processor executes the computer execution instructions, the video processing method according to the first aspect is implemented.

In a fifth aspect, an embodiment of the present disclosure provides a computer program product, including a computer program, and when the computer program is executed by a processor, the video processing method according to the first aspect is implemented.

In a sixth aspect, an embodiment of the present disclosure provides a computer program, where when the computer program is executed by a processor, the video processing method according to the first aspect is implemented.

BRIEF DESCRIPTION OF THE DRAWINGS

In order to explain the embodiments of the present disclosure or the technical solutions in the related art more clearly, drawings required to be used in the embodiments or the description of the related art will be introduced briefly in the following. It is obvious that the drawings in the following description are some embodiments of the present disclosure. For those skilled in the art, other drawings may also be obtained based on these drawings without paying creative effort.

FIGS. 3(*a*) and 3(*b*) are schematic diagrams I of a video processing interface provided by an embodiment of the present disclosure.

DESCRIPTION OF EMBODIMENTS

In order to make the purposes, technical solutions and advantages of embodiments of the present disclosure clearer, the technical solutions in the embodiments of the present disclosure will be described clearly and comprehensively in conjunction with the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative efforts belong to the protection scope of the present disclosure.

In the related art, users can manually add stickers to people or objects in a video when processing the video or performing a live video streaming, so as to cover the people or objects through the stickers, meet users' personalized needs and enrich video interaction functions, and further improve user experience. However, in this process, the users are required to manually select a position to be occluded in the video, which is cumbersome and has poor occlusion effect.

In order to solve the above problems, a technical concept of the present disclosure is as follows: in a process of video processing, after a user selects a target sticker for a target part, the target part to be occluded in a video to be processed is automatically identified, and the sticker is displayed on the target part to realize occlusion. At the same time, an editing control is set on the target sticker to realize editing of an added target sticker. Because there is no need to manually add a sticker, a sticking operation can be simplified and an occlusion effect of the sticker can be improved. In addition, after adding the sticker, the sticker can also be edited and adjusted, which can further improve the flexibility and convenience in the process of video processing and improve the user experience.

For ease of understanding, an application scenario of the embodiments of the present disclosure will be described first in conjunction with FIG. 1.

Figure 1:
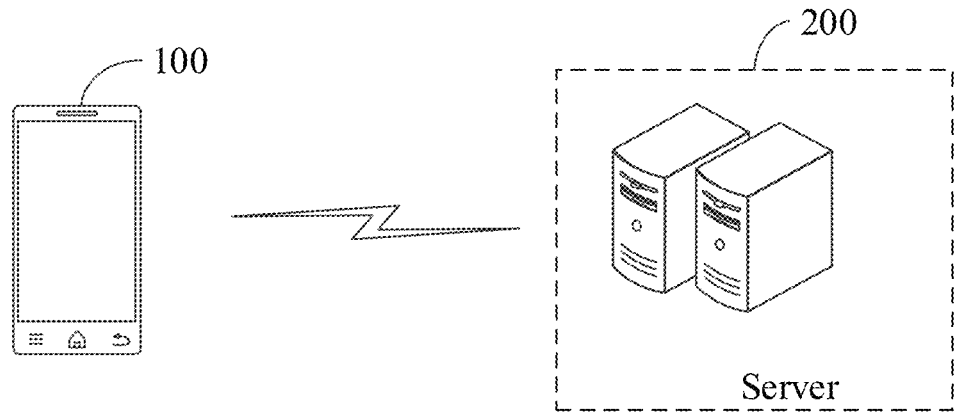
FIG. 1 is a schematic diagram of an application scenario of a video processing method provided by an embodiment of the present disclosure.

FIG. 1 is a schematic diagram of an application scenario of a video processing method provided by an embodiment of the present disclosure. Referring to FIG. 1, the scenario includes a terminal device 100.

The terminal device 100 may be a mobile terminal (for example, a smart phone, a handheld computer, a tablet computer and other mobile devices with video processing functions, a wearable electronic device), a computer device (for example, a desktop computer, a laptop computer, an all-in-one machine, a smart home device, etc.), etc. FIG. 1 is illustrated with a smartphone as an example, but is not limited thereto.

In a practical application, a user can import a video to be processed into the terminal device 100, thereby realizing a processing of the video to be processed through the terminal device 100.

In some embodiments, the scenario may also include a server 200, and the terminal device 100 may communicate with the server 200 through a wireless or wired network for sending data to the server 200. Where the wireless network may be a communication network such as 2G (2nd-Generation) or 3G (3rd-Generation) or 4G (4th-Generation) or 5G (5th-Generation), and may also be a wireless local area network, which is not limited here. During a video processing process, the user triggers operations such as video uploading, video editing, adding stickers, etc., through the terminal device 100, then sends operation data to the server 200, and the server 200 performs corresponding video processing operations.

It should be noted that the solution provided by the embodiment of the present disclosure can be applied to various video processing scenarios, for example, video post-processing, video picture processing during live streaming and video processing during video shooting.

It should be understood that FIG. 1 is simply a schematic diagram of an application scenario provided by the embodiment of the present disclosure. The embodiment of the present disclosure does not limit types of devices and the number of devices included in FIG. 1, nor does it limit a location relationship between devices in FIG. 1. For example, in the application scenario shown in FIG. 1, a data storage device may also be included, and the data storage device may be an external memory relative to the server 200, or may be an internal memory integrated in the server 200. In addition, the server 200 may be a standalone server, or may also be a service cluster, etc.

The technical solutions of the embodiments of the present disclosure and how the technical solutions of the present disclosure can solve the above technical problems will be described in detail with specific embodiments. The following specific embodiments may be combined with each other, and the same or similar concepts or processes may not be repeated in some embodiments. Embodiments of the present disclosure will be described below in conjunction with accompanying drawings.

Figure 2:
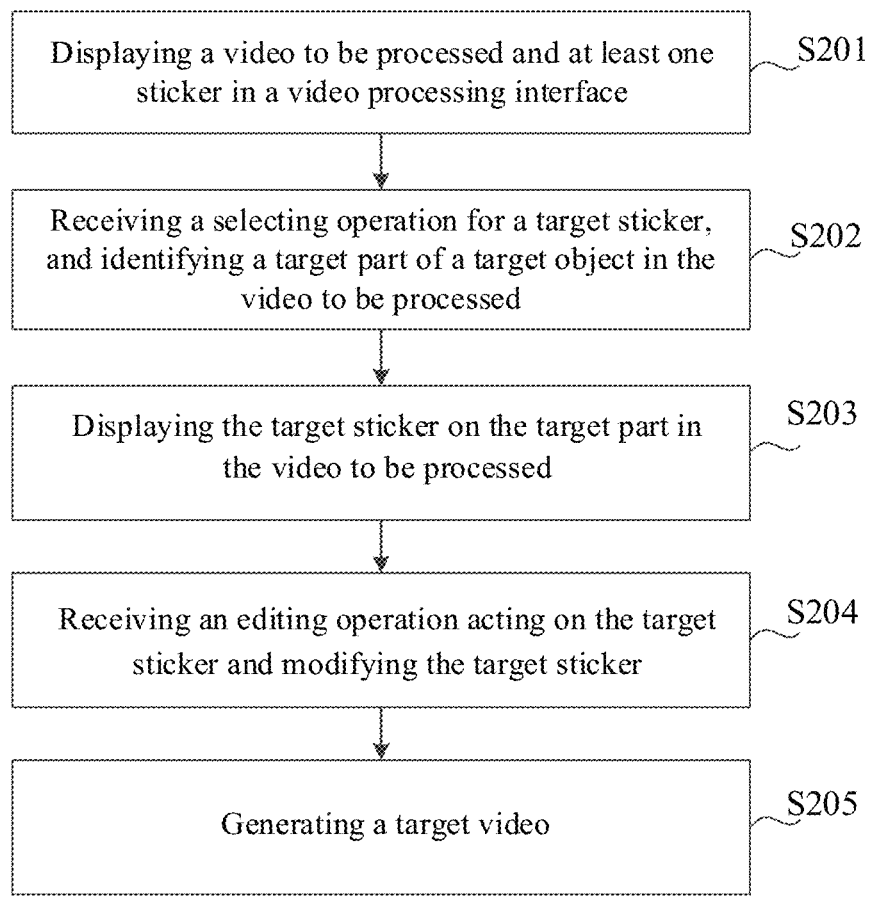
FIG. 2 is a schematic flowchart I of a video processing method provided by an embodiment of the present disclosure.

FIG. 2 is a schematic flowchart I of a video processing method provided by an embodiment of the present disclosure. The video processing method provided by the present embodiment may be applied to the terminal device or the server shown in FIG. 1. Referring to FIG. 2, the video processing method provided by the present embodiment includes the following steps.

S201: displaying a video to be processed and at least one sticker in a video processing interface.

In some embodiments, the video to be processed may be uploaded by a user, or the video to be processed may also be collected by the user in real time through an image acquisition device of a terminal device, such as a camera and other components.

In a practical application, a specific type of the sticker is not specifically limited in the embodiment of the present disclosure, exemplarily, the sticker may be a static sticker or a dynamic sticker, such as an animal image, an animation image, a still life image, etc. A target sticker is used to cover at least a portion of a target part.

FIGS. 3(a) and 3(b) are schematic diagrams I of a video processing interface provided by an embodiment of the present disclosure. It should be noted that a target part of a target object in FIGS. 3(a) and 3(b) is illustrated with a face as an example, but it is not limited to this. As shown in FIG. 3(a), four types of stickers, namely, sticker 1, sticker 2, sticker 3 and sticker 4, are displayed in the video processing interface, and each sticker type includes multiple stickers. The user may select the target sticker in various stickers by sliding up and down or sliding left and right.

S202: receiving a selecting operation for the target sticker, and identifying the target part of the target object in the video to be processed.

It should be noted that a type of the target object is not limited in the embodiment of the present disclosure. For example, the target object may be any object on which a sticker (such as a person, an animal, etc.) needs to be added. Correspondingly, the target part may be any part of the target object. For example, for a person, the target part may be a part such as a face, hands and hair, or may also be a local area of the above parts, such as one or more areas such as eyes and mouth.

As shown in FIG. 3(a), the user can select the target sticker by clicking a sticker, and accordingly, after the user selects the target sticker, the target part of the target object in the video to be processed is identified.

In some embodiments, the target part of the target object is fixed, that is, during the video processing process, all stickers are used to cover a certain type of part.

Exemplarily, during this video processing process, all the stickers are used to cover the target part of people, such as a hand. When the user selects the target sticker, the hand in an image to be processed is automatically identified.

In other embodiments, the user may set the target object and/or target part to be processed in this video processing process before entering the video processing interface. For example, if the target object set by the user is a person and the target part is a hand, all the stickers are used to cover the hand in this video processing process.

The user may also set multiple target parts, for example, a first area of a video editing page displays an image to be processed including one or more target objects and a second area of the video editing page displays multiple target stickers, the user can select a first target sticker and drag the first target sticker to a first target part of a first target object, then select a second target sticker and drag the second target sticker to a second target part of a second target object or the first target object.

After an addition is completed, in response to receiving an add completion confirmation operation of the video editing page, the first target sticker is added to all video frames including the first target part, and the first target sticker in each video frame covers the first target part in the video, and the second target sticker is added to all video frames including the second target part in the video, and the second target sticker in each video frame covers the second target part. The first target object and the second target object are any target objects among multiple target objects. Of course, it is not limited to adding two stickers simultaneously, and will not be repeated here. As a result, multiple stickers are added to the video simultaneously, and each sticker can be matched to an area of each frame including the target part in the video, which enriches the video interaction mode and improves the video editing efficiency.

In other embodiments, the target part of the target object in the video to be processed may also be identified and added according to a type of the target sticker (shape type, color type, etc.). Specifically, in response to receiving the selecting operation for the target sticker, the target part matching the type of the target sticker in the image to be processed is identified and the target sticker is added to the target part. Exemplarily, a type of the first target sticker is a slender type, and an arm in the image to be processed is also identified as the slender type, then the arm is determined as the first target part; a type of the second target sticker is a circular type, and a face in the image to be processed is also identified as the circular type, then the face is determined as the second target part. After the user selects the first target sticker and the second target sticker, there is no need to move the target sticker to the target part. The first target sticker is automatically matched to each video frame including the first target part in the video to cover the arm, and the second target sticker is automatically matched to each video frame including the second target part in the video to cover the face. As a result, the user operation is simplified and the user experience is improved. For another example, sticker 1 is a sticker for covering hair, sticker 2 is a sticker for covering animals, and sticker 4 is a sticker for covering hands. In an identification process, if a target sticker in sticker 1 is selected, the hair of a person in the video to be processed is identified according to the target sticker. Other types of stickers are similar, and will not be repeated here.

In some embodiments, the sticker is an editable sticker, and one or more editing controls are displayed around the sticker to facilitate an operation when editing the video, for example, after moving the target sticker to the target part of the image to be processed. The editing controls are controls for editing properties of a sticker element, and the properties of the sticker element include a brightness attribute, a chroma attribute, a contrast attribute, an aspect ratio attribute, etc., and corresponding editing controls include a brightness adjustment control, a chroma adjustment control, a contrast adjustment control, and an aspect ratio adjustment control, and the sticker element is a sticker pattern, such as a dog head pattern, a flower pattern, a beverage bottle pattern, etc. Compared with existing stickers, the present disclosure adopts the editable sticker with editing controls exposed around the sticker element, which greatly meets the user's needs for rapid adjustment of the sticker, is conducive to improving a matching degree of the target sticker and the target part, and shortens the interaction path and improves the editing efficiency.

S203: displaying the target sticker on the target part in the video to be processed.

Accordingly, after successful identification, the target sticker is displayed on the target part. As shown in FIG. 3(*b*), when the user selects "No. 6 sticker" in the sticker 1, the "No. 6 sticker" is displayed on faces of all people in the video to be processed.

In an implementation, if the identification fails, corresponding prompt information may also be displayed in the video processing interface, where the prompt information is used to prompt at least one of the following information: prompt that a current identification of the target object fails, indication of manually selecting the target part by the user, indication of uploading a new video to be processed by the user, and indication of adjusting a progress of the video to be processed to a position including the target part by the user.

S204: receiving an editing operation acting on the target sticker and modifying the target sticker.

The editing operation includes at least one of a brightness adjusting operation, a chroma adjusting operation, a contrast adjusting operation, a proportion adjusting operation, a size adjusting operation, a deleting operation, a replacing operation and a direction adjusting operation.

In some embodiments, receiving the editing operation acting on the target sticker may be a triggering operation acting on the editing control displayed on the target sticker.

In an implementation, after the target sticker is displayed on the target part, the editing control is displayed on the target sticker. As shown in FIG. 3(*b*), the editing control includes a size adjustment control, a deletion control, a replacement control, a direction adjustment control, etc. The user can adjust the target sticker through the editing control, but an adjustment mode is not specifically limited in the embodiment of the present disclosure.

Through this solution, the user can directly edit and adjust the target sticker, and the operation is relatively simple, which can further improve the flexibility and convenience in the video processing process, thus meeting the personalized needs of users, enriching the video interaction function, and further improving the user experience.

In some embodiments, when the user triggers the deletion control or the replacement control, the target sticker on the target part is deleted, and prompt information is displayed in the video processing interface, where the information is used to indicate an addition of a target sticker to the target object again by the user.

In an implementation, after the target sticker is displayed on the target part, the editing control as shown in FIG. 3(b) can also be displayed in the video processing interface, such as the deletion control and the replacement control, so that the user can click the editing controls in the interface to perform corresponding operations on the target sticker.

S205: generating a target video.

In this step, after the user adds the target sticker to the target part, the target video is generated according to the video to be processed after the target sticker is added, where the target sticker added by the user is displayed on the target part in the target video.

The method of generating the target video is not specifically limited in the embodiment of the present disclosure. For example, after displaying the target sticker on the target part, a control for generating the target video may be displayed in the video processing interface synchronously, and when the user clicks the control, the target video can be generated, or the target video may be generated directly after displaying the target sticker on the target part.

It should be noted that the above step S204 is an optional step, that is, after step S203, if the user does not modify the target sticker, the target video can be generated according to the target sticker added by the user; if the user modifies the target sticker, the target video is generated according to a modified target sticker, and at this time, the modified target sticker is displayed on the target part of a generated target video.

In the embodiment of the present disclosure, the target part of the target object in the video to be processed can be automatically identified without manual selection by the user, which simplifies the sticking operation and improves the occlusion effect of the sticker. In addition, after adding the sticker, the sticker can be edited and adjusted, thereby further improving the flexibility and convenience in the video processing process and improving the user experience.

It should be noted that the embodiment of the present disclosure does not specifically limit the solution of identifying the target part of the target object in the video to be processed. For example, in some embodiments, the target part of the target object in the video to be processed can be detected by an image recognition technology.

In other embodiments, the user may also manually select the target object, so as to identify the target part of the target object. Exemplarily, the user may click to select the target object in the video to be processed, and correspondingly, when adding the target sticker, a user's selecting operation of the target object in the video to be processed is received, and the target part of the target object is identified.

In other embodiments, the user may also directly and manually select the target part of the target object, and correspondingly, a user's selecting operation of the target part in the video to be processed is received and the target part in the video to be processed is detected. Exemplarily, the user may click to select the target part in the video to be processed, and correspondingly, when adding the target sticker, the user's selecting operation of the target part in the video to be processed is received, and the target part is identified.

In the embodiment of the present disclosure, various manners for selecting the target part are provided, which can improve the flexibility of the video processing process and improve the user experience.

Figure 4:
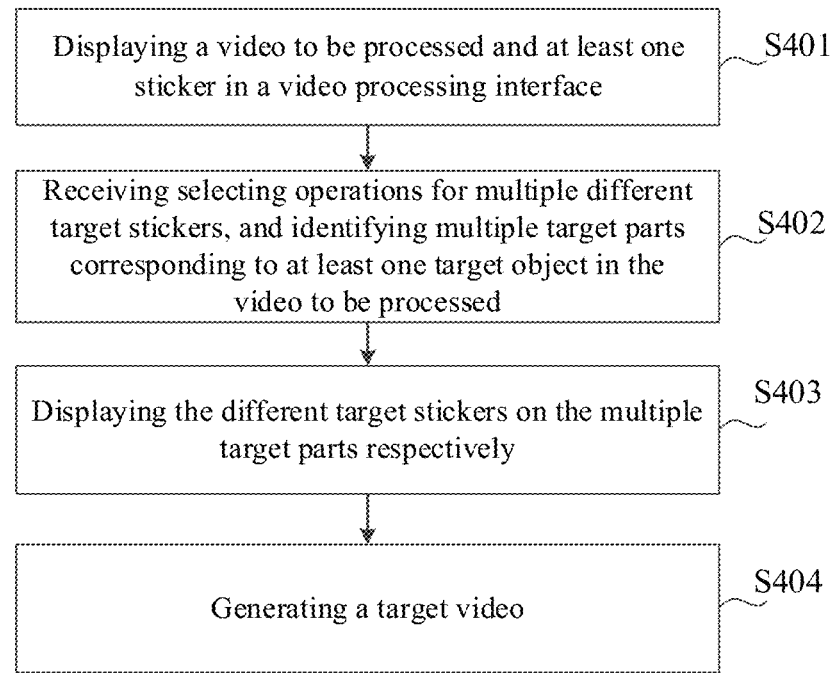
FIG. 4 is a schematic flowchart II of a video processing method provided by an embodiment of the present disclosure.

In a practical application, when the video to be processed includes multiple target objects, different target stickers may be added for different target objects. FIG. 4 is a schematic flowchart II of a video processing method provided by an embodiment of the present disclosure. As shown in FIG. 4, the video processing method includes the following steps.

S401: displaying a video to be processed and at least one sticker in a video processing interface.

It should be noted that for the displaying of the video to be processed and the at least one sticker in the video processing interface, reference can be made to FIG. 3(a), which will not be repeated here.

S402: receiving selecting operations for multiple different target stickers, and identifying multiple target parts corresponding to at least one target object in the video to be processed.

Where the target parts may be parts on a same target object or parts on different target objects, for example, when the target parts are faces, the target parts may be faces of different people, and when the target parts are hands, the target parts may be hands of a same person.

Figures 5A, 5B:
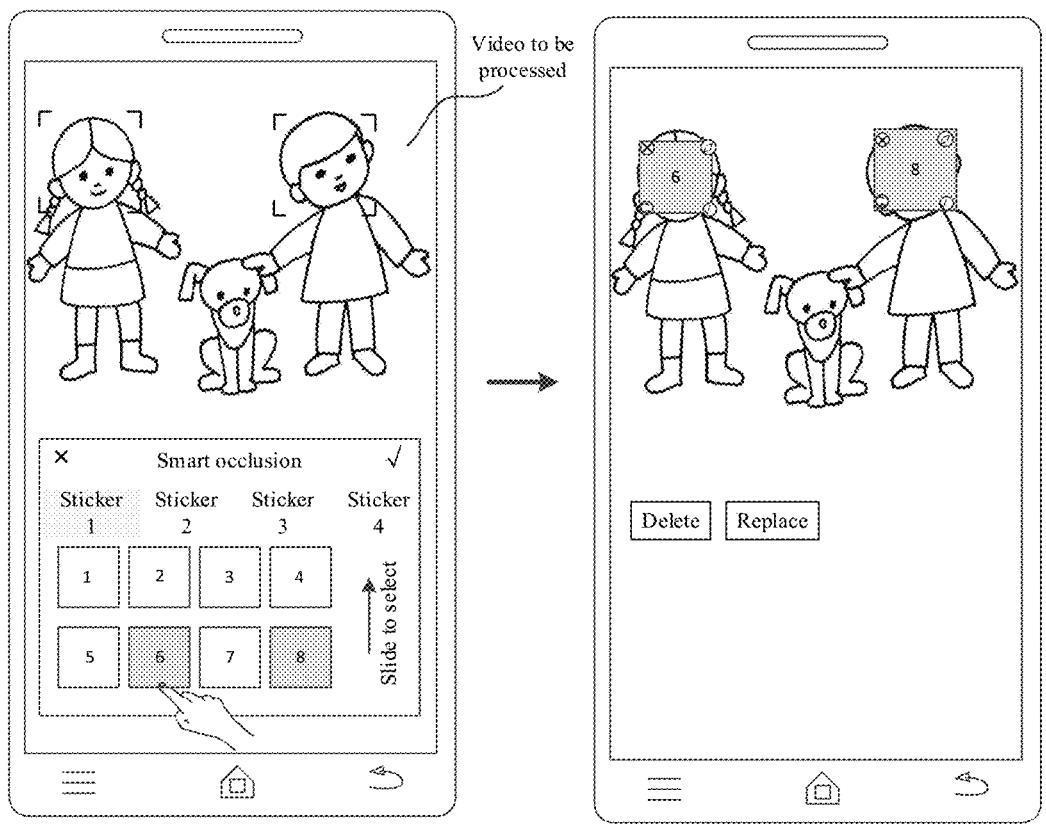
FIGS. 5(*a*) and 5(*b*) are schematic diagrams II of a video processing interface provided by an embodiment of the present disclosure.

FIGS. 5(a) and 5(b) are schematic diagrams II of a video processing interface provided by an embodiment of the present disclosure. As shown in FIG. 5(a), when a user selects multiple different target stickers, such as "No. 6 sticker" and "No. 8 sticker" in sticker 1, in an identification process, faces corresponding to the number of target stickers in the video to be processed are recognized. It should be noted that the target part of the target object in FIGS. 5(a) and 5(b) is illustrated with a face as an example, but is not limited to this.

S403: displaying the different target stickers on the multiple target parts respectively.

As shown in FIG. 5(b), "No. 6 sticker" and "No. 8 sticker" are displayed on different target parts respectively. Specifically, the solution of displaying the different target stickers on target parts is not specifically limited in the embodiment of the present disclosure, for example, the target stickers selected by the user may be randomly displayed on the multiple target parts.

In other embodiments, a more suitable target sticker may also be matched for each target part according to feature information of the target part, which specifically includes the following steps:

(1) acquiring the feature information of the target part;
(2) determining, according to the feature information, a matching degree between each target sticker of the multiple different target stickers and the target part;
(3) displaying a target sticker having the highest matching degree with the target part on the target part.

Where the feature information includes at least one of shape information, type information and color information.

Specifically, when the feature information is the shape information, if the target part is circular, an approximate circular target sticker may be selected from the multiple target stickers; when the feature information is the type information, if the target part is face, an avatar target sticker may be selected from the multiple target stickers, and if the target part is eye, an eye target sticker may be selected from the multiple target stickers.

It should be understood that, similar to the above-mentioned embodiments, after displaying the target sticker in the target part, the user may also modify the target sticker, and the modification manner is similar to the solution provided in the embodiment shown in FIG. 2, which will not be repeated here.

In some embodiments, when the user manually selects the target object or the target part and adds the target stickers to the multiple target parts, the target stickers may be added to the multiple target parts one by one. Exemplarily, the user may manually select a target object or a target part in the video to be processed, and then select a target sticker for it; after the selection is successful, a selected target part in the video to be processed is identified, and the target sticker is displayed on the target part, and further, stickers are added to other target parts in a same manner.

In some embodiments, when the target sticker is a dynamic sticker, the dynamic sticker may move accordingly according to a movement of the target part.

Specifically, the method includes the following steps:
(1) detecting action information of at least a portion of the target part in the video to be processed;
(2) controlling a corresponding area of the target sticker displayed on the target part to follow the action information for corresponding movement, where the corresponding area of the target sticker is used to cover at least the portion of the target part.

In some embodiments, the target sticker automatically follows the movement of the target part, and a local area of the target part has a different movement frequency and/or movement mode from a whole target part, and a local area of the target sticker corresponding to the local area of the target part has a different movement frequency and/or movement mode from the target sticker, and the local area of the target part has a same movement frequency and/or movement mode as the local area of the target sticker, the target part has a same movement frequency and/or movement mode as the target sticker. Further, when identifying a local area action of the target part, the local area of the target sticker generates a style corresponding to the local area of the target sticker and follows the local area action of the target part.

Exemplarily, an example is taken where the target part is a face, at least a portion of the target part/local area of the target part is an eye area, and the target sticker is a coke bottle, when the face moves left and right and the eyes blink at the same time in the video, the coke bottle also moves left and right correspondingly, and the local area covering the eyes in the coke bottle also blink accordingly. Specifically, the local area covering the eyes in the coke bottle generate a pattern corresponding to the eyes and follow the movements of the eyes.

S404: generating a target video.

Where the target sticker is displayed on the target part in the target video.

It should be noted that the solution of step S404 is similar to the solution of step S205 in the embodiment shown in FIG. 2, reference can be made to the above-mentioned embodiments for details, and will not be repeated here.

In an implementation, before generating the target video, a preview video may be displayed on the video processing interface according to a currently added target sticker, so that the user can view a current sticker effect in time.

Specifically, after displaying the target sticker on the target part of the video to be processed, a first video with a first preset duration may be generated, and the target sticker is displayed on the target part of the target object in the first video, where the first preset duration is less than a duration of the video to be processed. It should be noted that a length of the first preset duration is not specifically limited, for example, it may be any value less than the duration of the video to be processed, such as 3 seconds and 5 seconds.

In some embodiments, after displaying the target sticker on the target part, displaying information of the target sticker on the target part may also be adjusted. A solution for adjusting the duration of the target sticker will be described in detail below in combination with specific embodiments.

Figure 6:
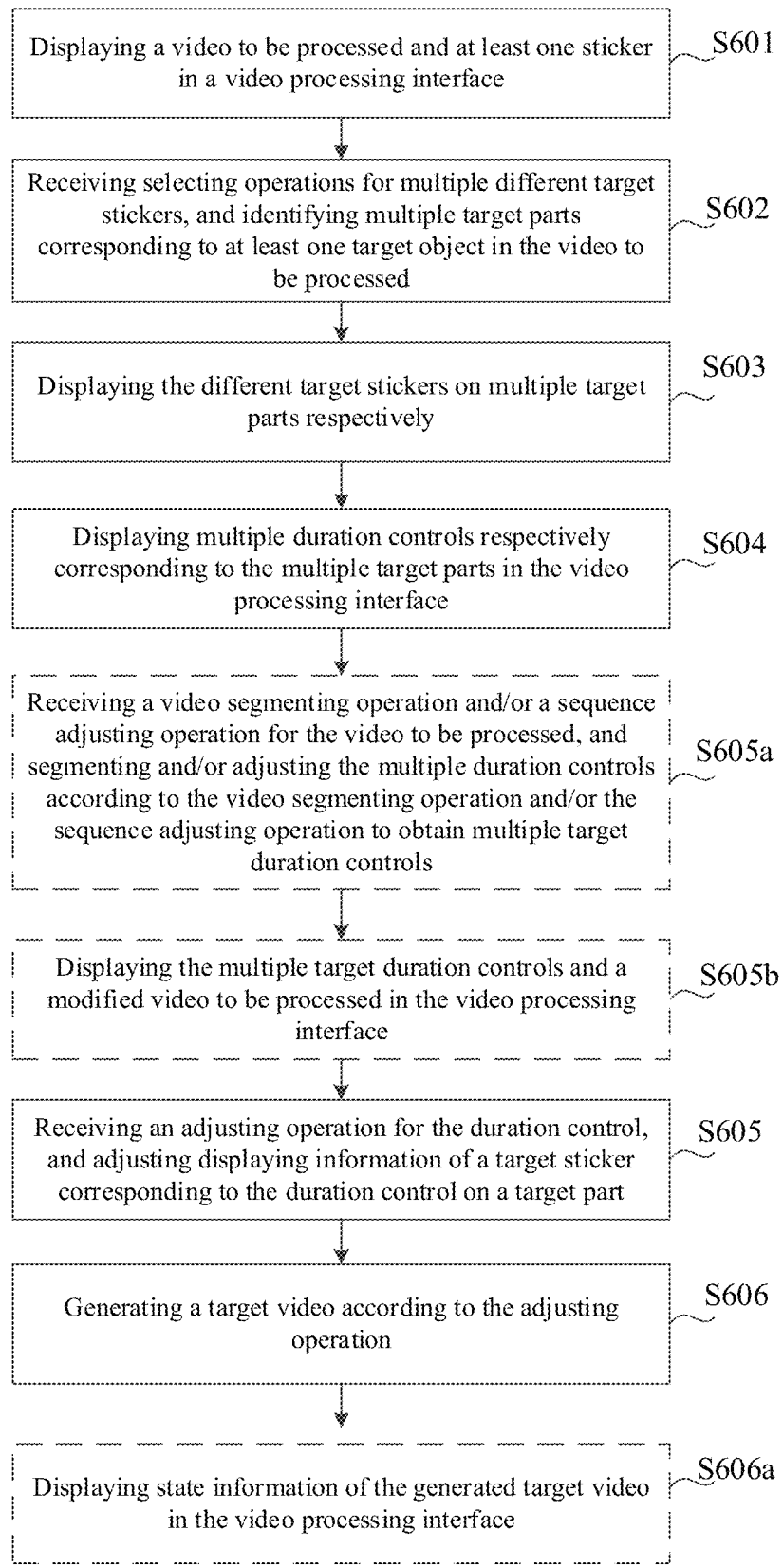
FIG. 6 is a schematic flowchart III of a video processing method provided by an embodiment of the present disclosure.

FIG. 6 is a schematic flowchart III of a video processing method provided by an embodiment of the present disclosure. As shown in FIG. 6, the video processing method provided by the embodiment of the present disclosure includes the following steps.

S601: displaying a video to be processed and at least one sticker in a video processing interface S602: receiving selecting operations for multiple different target stickers and identifying multiple target parts corresponding to at least one target object in the video to be processed.

S603: displaying the different target stickers on the multiple target parts respectively.

It should be noted that the solutions and principles of steps S601-S603 are similar to those of steps S401-S403 in the embodiment shown in FIG. 4, reference can be made to the above-mentioned embodiments for details, and will not be repeated here.

S604: displaying multiple duration controls respectively corresponding to the multiple target parts in the video processing interface.

Where each duration control (also referred to as a sticker track control, or a sticker displaying control) is used to display displaying information of at least one target sticker on a corresponding target part, and the displaying information includes: a display time of the target sticker on the corresponding target part, a frame where the target sticker is located in the video, and so on.

FIGS. 7(*a*) and 7(*b*) are schematic diagrams III of a video processing interface provided by an embodiment of the present disclosure. As shown in FIG. 7(*a*), duration control 1 and duration control 2 are used to display the displaying information of target stickers on target part 1 and target part 2 respectively, and each duration control may control at least one target sticker.

Exemplarily, during a video processing process, at different moments of the video to be processed, the target part 1 is added with "No. 6 sticker" and "No. 3 sticker", and the target part 2 is added with "No. 8 sticker" and "No. 5 sticker", taking the duration control 1 as an example, time periods 1 and 2 are display durations of "No. 6 sticker" and "No. 3 sticker" on the target part 1 respectively.

S605: receiving an adjusting operation for the duration control, and adjusting displaying information of a target sticker corresponding to the duration control on a target part.

S606: generating the target video according to the adjusting operation.

Where the adjusting operation includes at least one of a deleting operation, a replacing operation and a duration adjusting operation.

Please continue to refer to FIG. 7(*a*). While displaying the duration control in the video processing interface, an adjustment control may also be displayed in the video processing interface, such as a deletion control and a replacement control. The user can select the target sticker to be deleted or replaced on the duration control, and then delete or replace the corresponding target sticker in the video to be processed by triggering the deletion control or the replacement control.

Figure 7A:
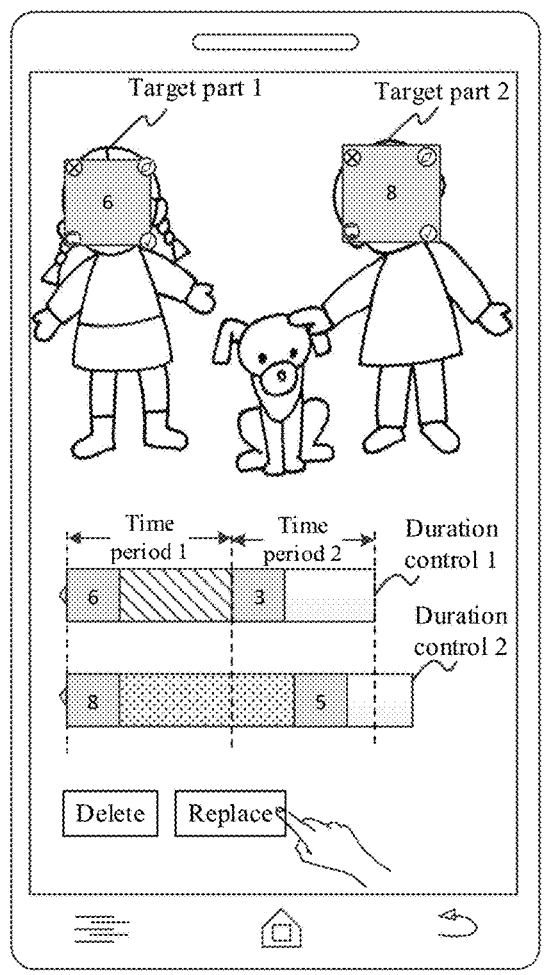
FIGS. 7(*a*) and 7(*b*) are schematic diagrams III of a video processing interface provided by an embodiment of the present disclosure.
Figure 7B:
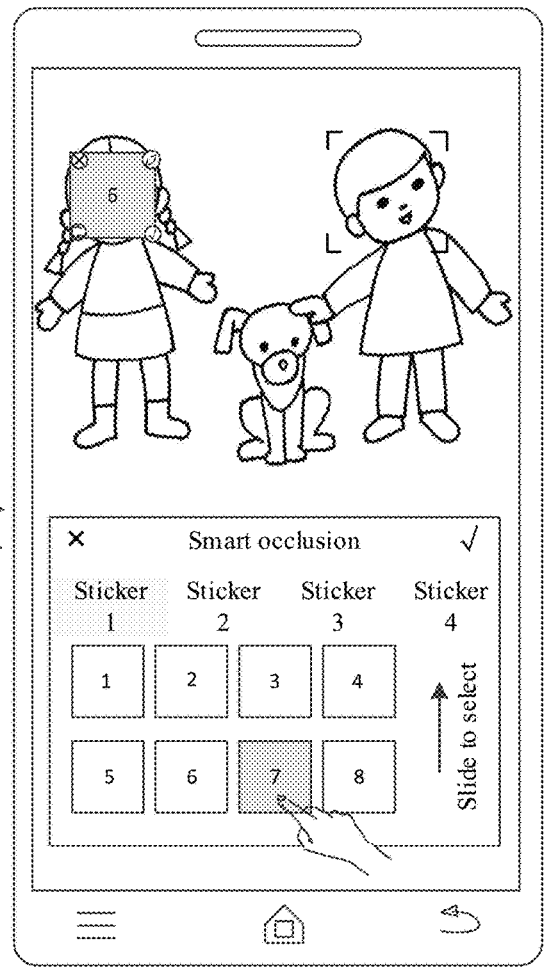

It should be noted that when the user triggers a replacement button, at least one sticker and the video to be processed are displayed in the video processing interface for the user to replace a new sticker for the target part. Exemplarily, as shown in FIG. 7(b), when the user triggers a replacing operation of "No. 8 sticker", the video to be processed and the at least one sticker are displayed in the video processing interface. After the user selects "No. 7 sticker", the process continues to return to an interface as shown in FIG. 7(a), "No. 8 sticker" in the duration control 2 is replaced with "No. 7 sticker", and at the same time, a corresponding time period of target part 2 in the video to be processed is displayed with "No. 7 sticker".

In a practical application, the duration adjusting operation is not specifically limited in the embodiment of the present disclosure. For example, the user may adjust a display time period of each target sticker on the duration control by sliding left and right, so as to adjust the displaying information of the target sticker corresponding to the duration control on the target part in the target video.

It should be noted that, in the embodiment of the present disclosure, take displaying duration controls corresponding to multiple target parts as an example, when the target sticker is only added to one target part, one duration control corresponding to this target part may be displayed and adjusted in the video processing interface in the same way.

In an implementation, after adding the target sticker to the target part of the video to be processed, the video to be processed with added target sticker may also be subjected to operations such as video segmentation and sequence adjustment, and the duration control is required to be adjusted synchronously, so that the duration control keeps corresponding to the video to be processed after segmentation or sequence adjustment. The following is a detailed description in conjunction with steps S606a-S606b.

S605a: receiving a video segmenting operation and/or a sequence adjusting operation for the video to be processed, and segmenting and/or adjusting the multiple duration controls according to the video segmenting operation and/or the sequence adjusting operation to obtain multiple target duration controls.

S605b: displaying the multiple target duration controls and a modified video to be processed in the video processing interface.

Where each of the target duration controls is used to display displaying information of a corresponding target sticker in the modified video to be processed on a target part, and the displaying information includes: a display time of the target sticker on the corresponding target part, a frame where the target sticker is located in the video, and so on.

Figure 8A:
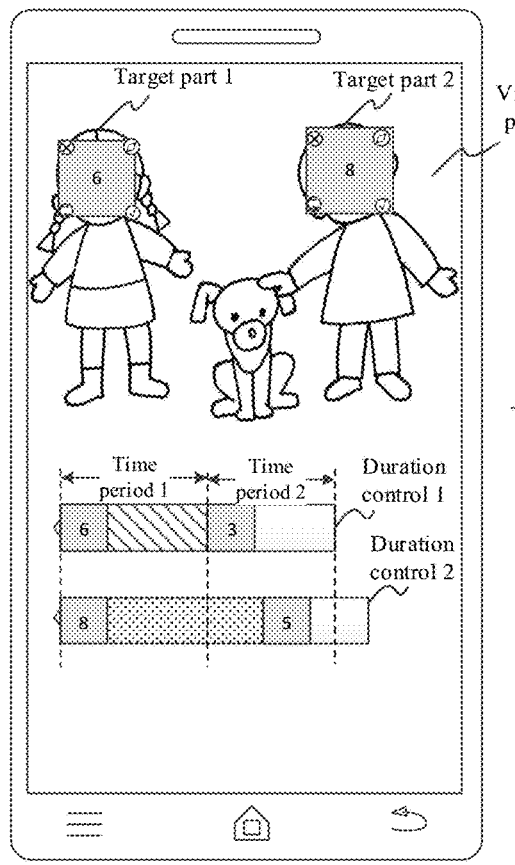
FIGS. 8(*a*) and 8(*b*) are schematic diagrams IV of a video processing interface provided by an embodiment of the present disclosure.
Figure 8B:
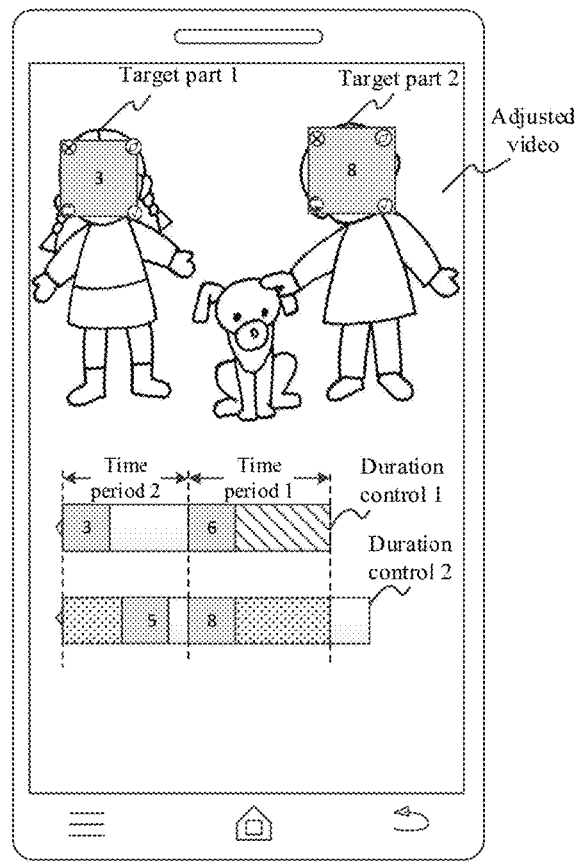

FIGS. 8(a) and 8(b) are schematic diagrams IV of a video processing interface provided by an embodiment of the present disclosure. FIG. 8(a) shows an unsegmented and/or unadjusted video processing interface, and FIG. 8(b) shows a segmented and/or adjusted video processing interface.

Exemplarily, an example is taken where a video corresponding to time period 1 and time period 2 is subject to segmentation and sequence switching, target stickers in the duration control 1 and duration control 2 are synchronously segmented and switched, and duration controls shown in FIG. 8(b) are displayed in the video processing interface.

S606a: displaying state information of the generated target video in the video processing interface.

Figure 9:
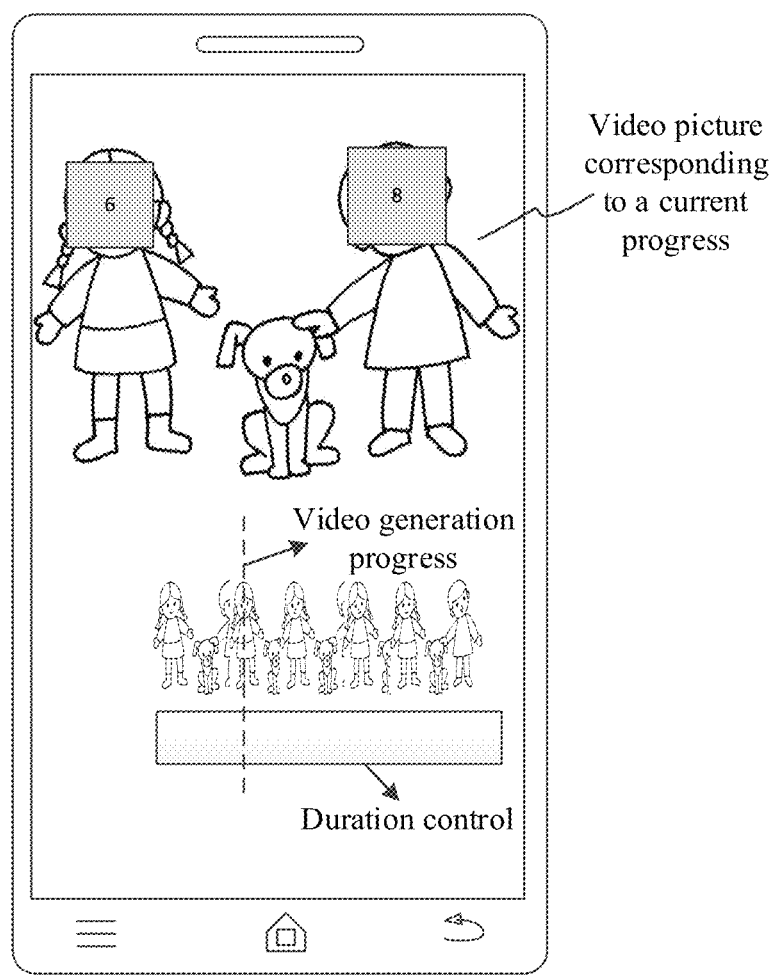
FIG. 9 is a schematic diagram V of a video processing interface provided by an embodiment of the present disclosure.

FIG. 9 is a schematic diagram V of a video processing interface provided by an embodiment of the present disclosure. As shown in FIG. 9, during a process of generating the target video, state information of a generated target video may also be displayed in the video processing interface, where the state information includes a generation progress of the target video and a video picture corresponding to a current generation progress.

It should be noted that a video generation progress in FIG. 9 is shown in a form of thumbnails. In a practical application, it may also be shown in other forms, such as a progress bar, a percentage and a duration control, etc.

In some embodiments, during a process of generating a video, the user may have other operational requirements, but these requirements may block a generation of the target video, so it is necessary to determine whether to continue to generate the target video according to an operation currently triggered by the user.

Specifically, a triggering operation of a function control is received, and a corresponding operation of the function control is executed according to a preset priority, or the generation of the target video is continued. Where the function control includes at least one of a caption recognition control, a sticker selection control and a video processing control, and the preset priority is used to indicate priorities for the function control and generating the target video, and the video processing control includes video beautification, music addition, caption addition or special effects addition.

Take the caption recognition control as an example, since a caption recognition process takes a certain amount of time and the time is not fixed, the generation of the target video will be affected. Therefore, in the process of generating the target video, a priority of caption recognition is lower than that of a target video generation process. When the user clicks the caption recognition control, the generation of the target video will be continued.

In an implementation, prompt information may also be displayed in a target video generation interface.

For the sticker selection control and the video processing control, their priorities can be the same as that of the target video processing process. Therefore, when the user triggers the sticker selection control or the video processing control, the sticker selecting operation or the video processing operation can be performed simultaneously with the target video processing.

In some embodiments, after the target sticker is selected and confirmed to be added, an area boundary of the target part may be identified, and a size of the sticker may be automatically adjusted to completely cover the area boundary of the target part.

Figure 10:
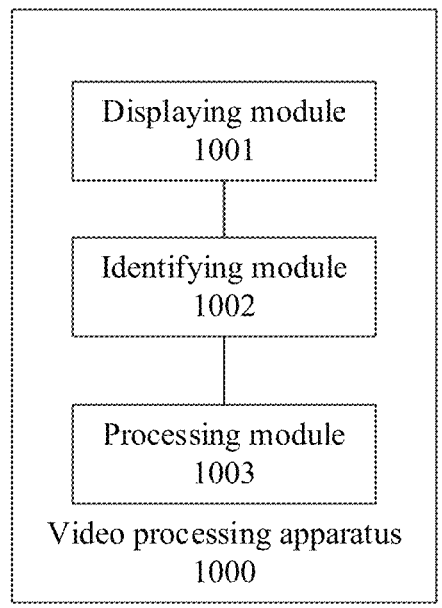
FIG. 10 is a schematic diagram of a video processing apparatus provided by an embodiment of the present disclosure.

Corresponding to the video processing method shown in the above embodiments, FIG. 10 is a schematic diagram of a video processing apparatus provided by an embodiment of the present disclosure. For ease of description, only parts related to the embodiments of the present disclosure are shown. As shown in FIG. 10, the video processing apparatus 1000 includes:

a displaying module 1001, configured to display a video to be processed and at least one sticker in a video processing interface; an identifying module 1002, configured to receive a selecting operation for a target sticker and identify a target part of a target object in the video to be processed; the displaying module 1001, further configured to display the target sticker on the target part in the video to be processed; a processing module 1003, configured to receive an editing operation acting on the target sticker, modify the target sticker and generate a target video, where the target part in the target video is displayed with the target sticker.

In an embodiment of the present disclosure, the target sticker includes at least one of a dynamic sticker and a static sticker, and the target sticker is used to cover at least a portion of the target part.

In an embodiment of the present disclosure, the identifying module 1002 is specifically configured to: receive selecting operations for multiple different target stickers and identify multiple target parts corresponding to at least one target object in the video to be processed; the processing module 1003 is specifically configured to: display the different target stickers on the multiple target parts respectively.

In an embodiment of the present disclosure, the identifying module 1002 is specifically configured to: detect the target part of the target object in the video to be processed through an image recognition technology; or, receive a selecting operation of the target object in the video to be processed, and identify the target part of the target object in the video to be processed; or, receive a selecting operation of the target part in the video to be processed, and identify the target part in the video to be processed.

In an embodiment of the present disclosure, the processing module 1003 is further configured to: generate a first video with a first preset duration, where the target sticker is displayed on the target part of the target object in the first video, and the first preset duration is less than a duration of the video to be processed; and display the first video in the video processing interface.

In an embodiment of the present disclosure, the displaying module 1001 is further configured to: display multiple duration controls respectively corresponding to the multiple target parts in the video processing interface, where each duration control is used to display displaying information of at least one target sticker on a corresponding target part.

In an embodiment of the present disclosure, the processing module 1003 is further configured to: receive an adjusting operation for the duration control, and adjust the displaying information of a target sticker corresponding to the duration control on a target part; and generate the target video according to the adjusting operation.

In an embodiment of the present disclosure, the processing module 1003 is further configured to: receive a video segmenting operation and/or a sequence adjusting operation for the video to be processed, and segment and/or adjust the multiple duration controls according to the video segmenting operation and/or the sequence adjusting operation to obtain multiple target duration controls; and display the multiple target duration controls and a modified video to be processed in the video processing interface, where each of the target duration controls is used to display displaying information of a corresponding target sticker in the modified video to be processed on a target part.

In an embodiment of the present disclosure, the displaying module 1001 is further configured to: display state information of the generated target video in the video processing interface, where the state information includes a generation progress of the target video and a video picture corresponding to a current generation progress.

In an embodiment of the present disclosure, the processing module 1003 is further configured to: detect action information of at least a portion of the target part in the video to be processed; and control a corresponding area of the target sticker displayed on the target part to follow the action information for corresponding movement, where the corresponding area of the target sticker is used to cover at least the portion of the target part.

In an embodiment of the present disclosure, the processing module 1003 is further configured to: acquire feature information of a target part; determine, according to the feature information, a matching degree between each target sticker of the multiple different target stickers and the target part; and display a target sticker having the highest matching degree with the target part on the target part.

The video processing apparatus provided in the present embodiment can be used to implement the technical solution of the embodiments of the video processing method, and its implementation principle and technical effect are similar, and will not be repeated here.

Figure 11:
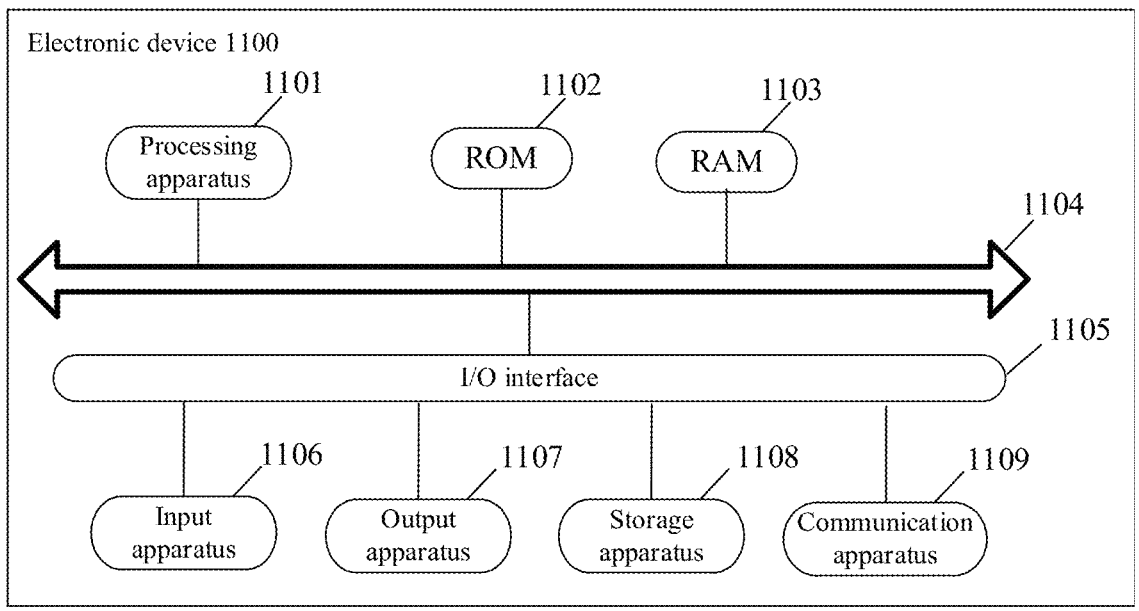
FIG. 11 is a schematic diagram of an electronic device provided by an embodiment of the present disclosure.

FIG. 11 is a schematic structural diagram of an electronic device provided by an embodiment of the present disclosure. It shows a schematic structural diagram of an electronic device 1100 suitable for implementing embodiments of the present disclosure, and the electronic device 1100 may be the above-mentioned terminal device. The terminal device may include, but is not limited to, a mobile terminal such as a mobile phone, a laptop, a digital broadcast receiver, a personal digital assistant (PDA), a portable android device (PAD), a portable multimedia player (PMP), an in-vehicle terminal (for example, in-vehicle navigation terminal) and so on, and a fixed terminal such as a digital TV, a desktop computer and so on.

It should be understood that the electronic device shown in FIG. 11 is only an example and should not impose any restriction on the functions and scope of use of the embodiments of the present disclosure.

As shown in FIG. 11, the electronic device 1100 may include a processing apparatus (for example, a central processing unit, a graphics processor, etc.) 1101, which may execute various appropriate actions and processing according to a program stored in a read only memory (ROM) 1102 or a program loaded from a storage apparatus 1108 into a random access memory (RAM) 1103. Various programs and data required for operations of the electronic device 1100 are also stored in the RAM 303. The processing apparatus 1101, the ROM 1102 and the RAM 1103 are connected to each other through a bus 1104. An input/output (I/O) interface 1105 is also connected to the bus 1104.

Generally, the following apparatuses may be connected to the I/O interface 1105: an input apparatus 1106 including, for example, a touch screen, a touch pad, a keyboard, a mouse, a camera, a microphone, an accelerometer, a gyroscope, etc.; an output apparatus 1107 including, for example, a liquid crystal display (LCD), a speaker, a vibrator, etc.; the storage apparatus 1108 including, for example, a magnetic tape, a hard disk, etc.; and a communication apparatus 1109. The communication apparatus 1109 may allow the electronic device 1100 to communicate wirelessly or through wires with other devices to exchange data. Although FIG. 11 shows the electronic device 1100 having various apparatuses, it should be understood that not all of the illustrated apparatuses are required to be implemented or provided. More or fewer apparatuses may alternatively be implemented or provided.

In particular, according to an embodiment of the present disclosure, processes described above with reference to flowcharts may be implemented as a computer software program. For example, an embodiment of the present disclosure includes a computer program product including a computer program carried on a computer-readable medium, the computer program includes a program code for executing the methods illustrated in the flowcharts. In such an embodiment, the computer program may be downloaded and installed from a network through the communication apparatus 1109, or installed from the storage apparatus 1108, or installed from the ROM 1102. When the computer program is executed by the processing apparatus 1101, the above-mentioned functions defined in the methods of the embodiments of the present disclosure are executed.

It should be noted that the computer-readable medium of the present disclosure may be a computer-readable signal medium or a computer-readable storage medium, or a combination of the above two. The computer-readable storage medium may be, for example, but is not limited to, an electrical, magnetic, optical, electromagnetic, infrared or semiconductor system, apparatus or device, or any combination of the above. More specific examples of the computer-readable storage medium may include, but are not limited to, an electrical connection with one or more wires, a portable computer disk, a hard disk, a random access memory (RAM), a read only memory (ROM), an erasable programmable read only memory (EPROM or flash), an optical fiber, a compact disc read-only memory (CD-ROM), an optical storage device, a magnetic storage device, or any suitable combination of the above. In the present disclosure, the computer-readable storage medium may be any tangible medium containing or storing a program, and the program may be used by, or used in combination with, an instruction execution system, apparatus or device. In the present disclosure, the computer-readable signal medium may include a data signal propagated in a baseband or as a part of a carrier wave, in which a computer-readable program code is carried. Such propagated data signal may take a variety of forms, including but not limited to an electromagnetic signal, an optical signal or a suitable combination of the above. The computer-readable signal medium may also be any computer-readable medium other than the computer-readable storage medium, and the computer-readable signal medium may send, propagate, or transmit a program for use by, or use in combination with, an instruction execution system, apparatus or device. The program code contained on the computer-readable medium may be transmitted with any suitable medium, including but not limited to: a wire, an optical cable, radio frequency (RF) or the like, or any suitable combination of the above.

The computer-readable medium may be included in the electronic device; or may also exist alone without being assembled into the electronic device.

The computer-readable medium carries one or more programs. When the one or more programs are executed by the electronic device, the electronic device is caused to execute the method according to the above embodiments.

A computer program code for performing operations of the present disclosure may be written in one or more programming languages or combinations thereof. The programming languages include, but are not limited to: object-oriented programming languages such as Java, Smalltalk, C++, and also include conventional procedural programming languages such as "C" language or similar programming languages. The program code may be executed completely on a user computer, partially on a user computer, as an independent software package, partially on a user computer and partially on a remote computer, or completely on a remote computer or a server. In a case involving the remote computer, the remote computer may be connected to the user computer through any kind of network, including a local area network (LAN) or a wide area network (WAN), or may be connected to an external computer (for example, connected through the Internet using an Internet service provider).

An embodiment of the present disclosure also provides a computer program, and when the computer program is executed by a processor, the methods according to the above embodiments are implemented.

According to the video processing method, the apparatus, the device, the storage medium, the electronic device, the computer program product and the computer program provided by the embodiments of the present disclosure, a video to be processed and at least one sticker are first displayed in a video processing interface; a selecting operation for a target sticker is received and a target part of a target object in the video to be processed is identified; the target sticker is displayed on the target part in the video to be processed; an editing operation acting on the target sticker is received and the target sticker is modified; and a target video is generated, where the target part in the target video is displayed with the target sticker. In the solution provided by the embodiments of the present disclosure, the target part of the target object in the video to be processed can be automatically identified without manual selection by the user, which can simplify a sticking operation and improve the occlusion effect of the sticker. In addition, after adding the sticker, the sticker can be edited and adjusted, so as to further improve the flexibility and convenience in the video processing process, meet the personalized needs of users, enrich the video interaction function, and improve the user experience.

The flowcharts and block diagrams in the accompanying drawings illustrate architectures, functions and operations of possible implementations of systems, methods and computer program products according to various embodiments of the present disclosure. In this regard, each block in the flowcharts or block diagrams may represent a module, a program segment, or a part of code that contains one or more executable instructions for implementing a specified logical function. It should also be noted that in some alternative implementations, the functions marked in the blocks may also occur in a different order than those marked in the drawings. For example, two blocks represented successively may actually be executed basically in parallel, or may sometimes be executed in an opposite order, depending on the function involved. It should also be noted that each block in the block diagrams and/or flowcharts and the combination of blocks in the block diagrams and/or flowcharts may be implemented by a dedicated hardware-based system performing specified functions or operations, or by a combination of dedicated hardware and computer instructions.

The units described in the embodiments of the present disclosure may be implemented in software, and may also be implemented in hardware. Where names of the units do not limit the units per se. For example, a first acquiring unit may also be described as "a unit that acquires at least two Internet protocol addresses".

The functions described above herein may be performed at least in part by one or more hardware logic components. For example, without limitation, exemplary types of the hardware logic components that may be used include: a field programmable gate array (FPGA), an application specific integrated circuit (ASIC), an application specific standard parts (ASSP), a system on chip (SOC), a complex programmable logic device (CPLD), etc.

In the context of the present disclosure, a machine-readable medium may be a tangible medium that may contain or store a program for use by, or use in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above. More specific examples of the machine-readable storage medium would include an electrical connection based on one or more wires, a portable computer disk, a hard disk, a random access memory (RAM), a read only memory (ROM), an erasable programmable read only memory (EPROM or flash memory), an optical fiber, a portable compact disk read-only memory (CD-ROM), an optical storage device, a magnetic storage device, or any suitable combination of the above.

The above description is only preferred embodiments of the present disclosure and an illustration of technical principles employed. Those skilled in the art should understand that the disclosure scope involved in the present disclosure is not limited to the technical solutions formed by the specific combination of above technical features, but also covers other technical solutions formed by arbitrary combination of the above technical features or their equivalent features without departing from the above disclosed concept, for example, a technical solution formed by replacing the above features with (but not limited to) the technical features with similar functions disclosed in the present disclosure.

In addition, although operations are described in a specific order, this should not be understood as requiring the operations to be performed in a specific order shown or in a sequential order. Under certain circumstances, multitasking and parallel processing may be advantageous. Similarly, although several specific implementation details are contained in the above discussion, these should not be interpreted as limiting the scope of the present disclosure. Certain features described in the context of separate embodiments may also be implemented in combination in a single embodiment. Conversely, various features described in the context of a single embodiment may also be implemented in multiple embodiments separately or in any suitable sub-combinations.

Although the present subject matter has been described in a language specific to structural features and/or logical actions of methods, it should be understood that the subject matter defined in appended claims is not necessarily limited to the specific features or actions described above. On the contrary, the specific features and actions described above are only exemplary forms for implementing the claims.

What is claimed is:

1. A video processing method, comprising:
   displaying a video to be processed and at least one sticker in a video processing interface;
   receiving a selecting operation for a target sticker and identifying a target part of a target object in the video to be processed;
   displaying the target sticker on the target part in the video to be processed;
   receiving an editing operation acting on the target sticker and modifying the target sticker; and
   generating a target video, wherein the target part in the target video is displayed with the target sticker;
   after displaying the target sticker on the target part in the video to be processed, the method further comprises:
   displaying a first control in the video processing interface, wherein the first control is used to display displaying information of the target sticker on a corresponding target part;
   receiving a video segmenting operation for the video to be processed, and segmenting the first control according to the video segmenting operation to obtain a second control;
   displaying the second control and a modified video to be processed in the video processing interface, wherein the second control is used to display displaying information of the target sticker in the modified video to be processed on the target part.

2. The video processing method according to claim 1, wherein the target sticker comprises at least one of a dynamic sticker and a static sticker, and the target sticker is used to cover at least a portion of the target part.

3. The video processing method according to claim 1, wherein receiving the selecting operation for the target sticker and identifying the target part of the target object in the video to be processed comprises:
   receiving selecting operations for multiple different target stickers and identifying multiple target parts corresponding to at least one target object in the video to be processed;
   displaying the target sticker on the target part comprises:
   displaying the different target stickers on the multiple target parts respectively.

4. The video processing method according to claim 1, wherein identifying the target part of the target object in the video to be processed comprises:
   detecting the target part of the target object in the video to be processed through an image recognition technology; or,
   receiving a selecting operation of the target object in the video to be processed, and identifying the target part of the target object in the video to be processed; or,
   receiving a selecting operation of the target part in the video to be processed, and identifying the target part in the video to be processed.

5. The video processing method according to claim 1, wherein before generating the target video, the method further comprises:
   generating a first video with a first preset duration, wherein the target sticker is displayed on the target part of the target object in the first video, and the first preset duration is less than or equal to a duration of the video to be processed; and
   displaying the first video in the video processing interface.

6. The video processing method according to claim 3, wherein after displaying the different target stickers on the multiple target parts respectively, the method further comprises:
   displaying multiple duration controls respectively corresponding to the multiple target parts in the video processing interface, wherein each duration control is used to display displaying information of at least one target sticker on a corresponding target part.

7. The video processing method according to claim 6, wherein generating the target video comprises:
   receiving an adjusting operation for the duration control, and adjusting displaying information of a target sticker corresponding to the duration control on a target part; and
   generating the target video according to the adjusting operation.

8. The video processing method according to claim 6, wherein before generating the target video, the method further comprises:

receiving a video segmenting operation and a sequence adjusting operation for the video to be processed, and segmenting and adjusting multiple duration controls according to the video segmenting operation and the sequence adjusting operation to obtain multiple target duration controls; and displaying the multiple target duration controls and a modified video to be processed in the video processing interface, wherein each of the target duration controls is used to display displaying information of a corresponding target sticker in the modified video to be processed on a target part.

9. The video processing method according to claim 1, further comprising:

displaying state information of the generated target video in the video processing interface, wherein the state information comprises a generation progress of the target video and a video picture corresponding to a current generation progress.

10. The video processing method according to claim 1, wherein when the target sticker is a dynamic sticker, the video processing method further comprises:

detecting action information of at least a portion of the target part in the video to be processed; and controlling a corresponding area of the target sticker displayed on the target part to follow the action information for corresponding movement, wherein the corresponding area of the target sticker is used to cover at least the portion of the target part.

11. The video processing method according to claim 3, wherein displaying the different target stickers on the multiple target parts respectively comprises:

acquiring feature information of a target part;

determining, according to the feature information, a matching degree between each target sticker of the multiple different target stickers and the target part; and displaying a target sticker having the highest matching degree with the target part on the target part.

12. An electronic device, comprising: at least one processor and a memory;

the memory stores computer execution instructions;

the at least one processor executes the computer execution instructions stored in the memory to cause the at least one processor to:

display a video to be processed and at least one sticker in a video processing interface;

receive a selecting operation for a target sticker and identify a target part of a target object in the video to be processed;

display the target sticker on the target part in the video to be processed;

receive an editing operation acting on the target sticker and modifying the target sticker; and generate a target video, wherein the target part in the target video is displayed with the target sticker;

after displaying the target sticker on the target part in the video to be processed, the at least one processor is further caused to:

display a first control in the video processing interface, wherein the first control is used to display displaying information of the target sticker on a corresponding target part;

receive a video segmenting operation or a sequence adjusting operation for the video to be processed, and segment or adjust the first control according to the video segmenting operation or the sequence adjusting operation to obtain a second control;

display the second control and a modified video to be processed in the video processing interface, wherein the second control is used to display displaying information of the target sticker in the modified video to be processed on the target part.

13. The electronic device according to claim 12, wherein the target sticker comprises at least one of a dynamic sticker and a static sticker, and the target sticker is used to cover at least a portion of the target part.

14. The electronic device according to claim 12, wherein the at least one processor is specifically caused to:

receive selecting operations for multiple different target stickers and identify multiple target parts corresponding to at least one target object in the video to be processed;

display the different target stickers on the multiple target parts respectively.

15. The electronic device according to claim 12, wherein the at least one processor is specifically caused to:

detect the target part of the target object in the video to be processed through an image recognition technology; or, receive a selecting operation of the target object in the video to be processed, and identify the target part of the target object in the video to be processed; or, receive a selecting operation of the target part in the video to be processed, and identify the target part in the video to be processed.

16. The electronic device according to claim 12, wherein the at least one processor is further caused to:

generate a first video with a first preset duration, wherein the target sticker is displayed on the target part of the target object in the first video, and the first preset duration is less than or equal to a duration of the video to be processed; and display the first video in the video processing interface.

17. The electronic device according to claim 14, wherein the at least one processor is further caused to:

display multiple duration controls respectively corresponding to the multiple target parts in the video processing interface, wherein each duration control is used to display displaying information of at least one target sticker on a corresponding target part.

18. The electronic device according to claim 17, wherein the at least one processor is specifically caused to:

receive an adjusting operation for the duration control, and adjust displaying information of a target sticker corresponding to the duration control on a target part; and generate the target video according to the adjusting operation.

19. The electronic device according to claim 17, wherein the at least one processor is further caused to:

receive a video segmenting operation and a sequence adjusting operation for the video to be processed, and segment and adjust multiple duration controls according to the video segmenting operation and the sequence adjusting operation to obtain multiple target duration controls; and display the multiple target duration controls and a modified video to be processed in the video processing interface, wherein each of the target duration controls is used to display displaying information of a corresponding target sticker in the modified video to be processed on a target part.

20. A non-transitory computer-readable storage medium, wherein the computer-readable storage medium stores computer execution instructions, and when a processor executes the computer execution instructions, the following operations are implemented:

displaying a video to be processed and at least one sticker in a video processing interface;

receiving a selecting operation for a target sticker and identifying a target part of a target object in the video to be processed;

displaying the target sticker on the target part in the video to be processed;

receiving an editing operation acting on the target sticker and modifying the target sticker; and generating a target video, wherein the target part in the target video is displayed with the target sticker;

after displaying the target sticker on the target part in the video to be processed, the following operations are further implemented:

displaying a first control in the video processing interface, wherein the first control is used to display displaying information of the target sticker on a corresponding target part;

receiving a video segmenting operation or a sequence adjusting operation for the video to be processed, and segmenting or adjusting the first control according to the video segmenting operation or the sequence adjusting operation to obtain a second control;

displaying the second control and a modified video to be processed in the video processing interface, wherein the second control is used to display displaying information of the target sticker in the modified video to be processed on the target part.

21. A video processing method, comprising:

displaying a video to be processed and at least one sticker in a video processing interface;

receiving a selecting operation for a target sticker and identifying a target part of a target object in the video to be processed;

displaying the target sticker on the target part in the video to be processed;

receiving an editing operation acting on the target sticker and modifying the target sticker; and generating a target video, wherein the target part in the target video is displayed with the target sticker;

after displaying the target sticker on the target part in the video to be processed further comprises:

displaying a first control in the video processing interface, wherein the first control is used to display displaying information of the target sticker on a corresponding target part;

receiving a sequence adjusting operation for the video to be processed, and adjusting the first control according to the sequence adjusting operation to obtain a second control;

displaying the second control and a modified video to be processed in the video processing interface, wherein the second control is used to display displaying information of the target sticker in the modified video to be processed on the target part.

\* \* \* \* \*